United States Patent
Basavarajappa et al.

(10) Patent No.: US 9,749,905 B2
(45) Date of Patent: Aug. 29, 2017

(54) CIRCUIT SWITCHED FALL BACK IMPROVEMENTS

(71) Applicant: INTEL CORPORATION, Santa Clara, CA (US)

(72) Inventors: Nitin Basavarajappa, Breinigsville, PA (US); Deepak Dash, Khordha (IN)

(73) Assignee: INTEL CORPORATION, Santa Clara, CA (US)

( * ) Notice: Subject to any disclaimer, the term of this patent is extended or adjusted under 35 U.S.C. 154(b) by 280 days.

(21) Appl. No.: 14/472,569

(22) Filed: Aug. 29, 2014

(65) Prior Publication Data

US 2016/0066218 A1    Mar. 3, 2016

(51) Int. Cl.
*H04W 36/00* (2009.01)

(52) U.S. Cl.
CPC .............................. *H04W 36/0022* (2013.01)

(58) Field of Classification Search
CPC . H04W 36/14; H04W 36/08; H04W 36/0066; H04W 48/18; H04W 74/0833; H04W 88/06
See application file for complete search history.

(56) References Cited

U.S. PATENT DOCUMENTS

| | | | |
|---|---|---|---|
| 2011/0143807 A1* | 6/2011 | Aue | H04B 7/0413 455/522 |
| 2012/0120789 A1* | 5/2012 | Ramachandran | H04W 36/0022 370/220 |
| 2014/0269275 A1* | 9/2014 | Jun | H04W 36/22 370/230 |
| 2014/0314046 A1* | 10/2014 | Jung | H04W 36/165 370/331 |
| 2015/0358875 A1* | 12/2015 | Kashikar | H04W 36/14 370/332 |
| 2016/0057682 A1* | 2/2016 | Yang | H04W 36/24 455/436 |

OTHER PUBLICATIONS

International Search Report and Written Opinion for PCT Application No. PCT/US2015/043851, dated Nov. 18, 2015 (13 pages).

* cited by examiner

*Primary Examiner* — Andrew Chriss
*Assistant Examiner* — Romani Ohri
(74) *Attorney, Agent, or Firm* — Carrie A Boone PC

(57) ABSTRACT

An improved circuit switched fallback (CSFB) method is disclosed, in which failures following several abnormal cases not anticipated by the 3rd Generation Partnership Project (3GPP) specification are avoided. User equipment implementing the improved CSFB method demonstrate increased performance in terms of call success rate and hence provide an improved user experience and an edge over Long Term Evolution (LTE) modem competitors. The improved CSFB method can be included in the 3GPP standards for such abnormal case handling and CSFB call recovery.

20 Claims, 9 Drawing Sheets

CIRCUIT SWITCHED FALL BACK IMPROVEMENTS

TECHNICAL FIELD

This application relates to a circuit switched fallback operation performed under the third generation partnership project (3GPP).

BACKGROUND

The evolved packet core (EPC) is the core network of advanced mobile communications systems. The EPC allows different radio access technology (RATs) to operate in an integrated manner. These radio access technologies include first generation wireless local area networks (LANs), second generation (2G) systems, such as global system for mobile communication, or GSM, third generation systems (3G) such as the universal mobile telecommunication system (UMTS), and fourth generation systems (4G) such as long-term evolution (LTE).

A user equipment (UE) such as a cellphone may support multiple RATs and is known herein as a multi-mode UE. Only one RAT is operable at a time in the multi-mode UE. A multi-mode UE that is said to be "camped" on one RAT is utilizing only the technology of that RAT. The UE may be switched from one RAT to another, thus switching where the UE is camped. Thus, the multi-mode UE may be camped on LTE, get switched from the 4G RAT to the 3G RAT, and is thereafter camped on UMTS.

The older 2G and 3G RATs employ both circuit-switched (CS) and packet-switched (PS) technologies. The PS domain is used to transmit data while the CS domain is used for voice. The 4G RAT, however, is uniquely a packet-switched domain. Therefore, data and voice are transmitted using packets only. Voice calls are provided in LTE using voice-over Internet protocol (VoIP).

VoIP is implemented in LTE-capable UE systems now but is considered purely as an optional feature, due to its involvement with the IMS (internet protocol multimedia subsystem) capability of the network and the UE. VoIP also adds to the cost of the deployment of the required infrastructure for the network vendor and a subscription for the UE. System designers had these issues in mind when they developed a circuit switched fallback (CSFB) procedure to support multi-mode UEs.

Described in the 3GPP specification, CSFB enables the provisioning of voice and other circuit switched (CS) domain services to 4G-capable UEs that support multiple modes. CS domain services include unified display interface (UDI) video/LCS/USSD (LCS stands for location service and USSD stands for unstructured supplementary service data) in a multi-mode UE. A CSFB-enabled multi-mode UE has the capability to switch from a packet-switched (PS) network to a circuit-switched (CS) network in order to send or receive CS voice calls, for example.

There are some conditions in which CSFB-enabled UEs are unable to successfully perform CS domain services. A dropped phone call or other error condition results when the UE experiences one of these conditions.

Thus, there is a continuing need for an improved CSFB mechanism that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, an improved circuit switched fallback (CSFB) method is disclosed, in which failures following several abnormal cases not anticipated by the 3GGP specification are avoided. User equipment implementing the improved CSFB method demonstrate increased performance in terms of call success rate and hence provide an improved user experience and an edge over LTE modem competitors. The improved CSFB method can be included in the 3GPP standards for such abnormal case handling and CSFB call recovery.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 1:
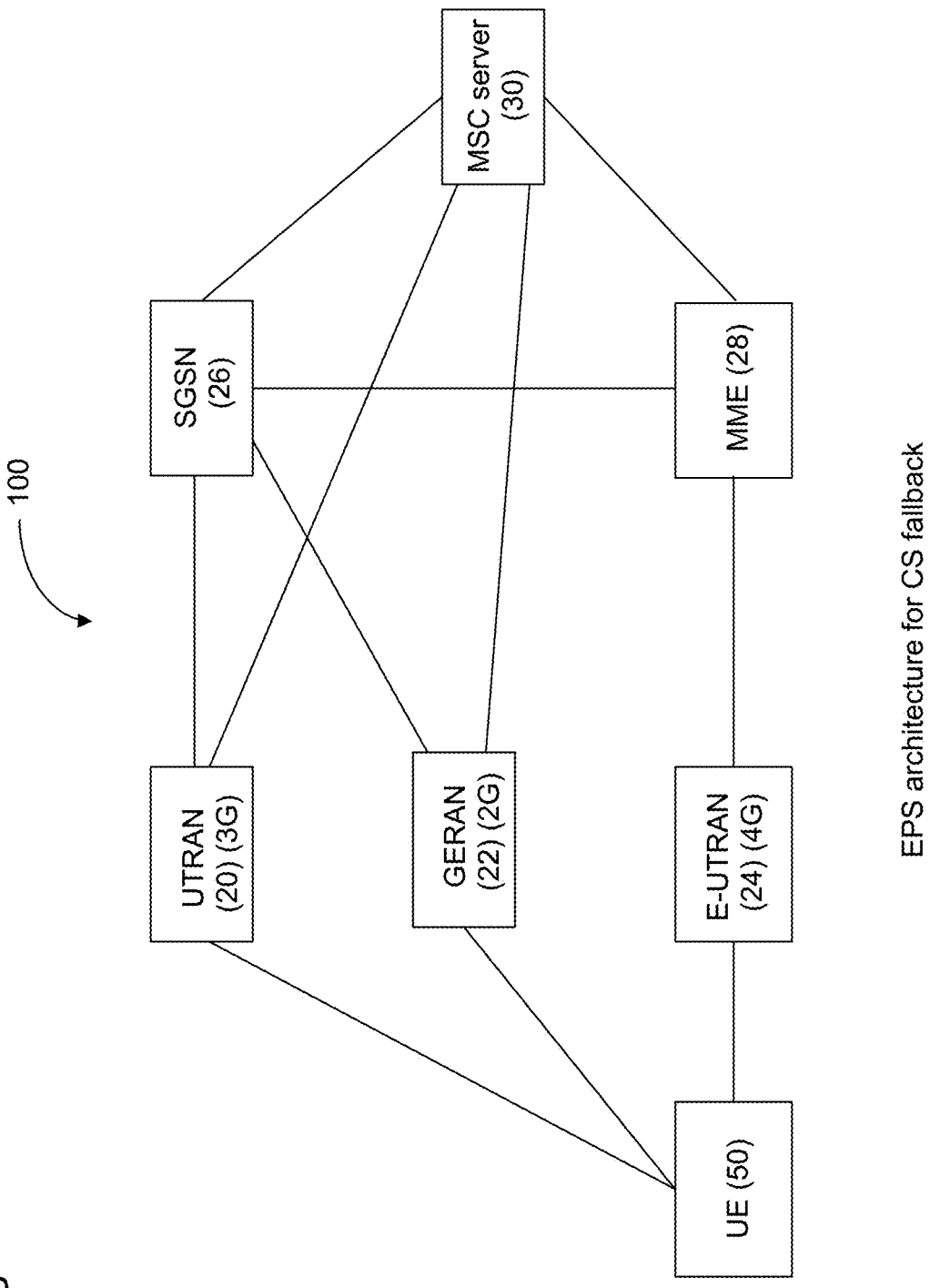
FIG. 1 is a simplified block diagram of an evolved packet system architecture for circuit switched fallback operations, according to some embodiments.

FIG. 1 is a simplified block diagram of an evolved packet system (EPS) architecture 100 in which CSFB operations take place, according to some embodiments. A multi-mode UE 50 supporting 2G, 3G, and 4G technologies operates in the EPS 100. The universal terrestrial radio access network (RAN) (UTRAN) supports 3G operations, the global system for mobile communication (GSM) edge RAN (GERAN) supports 2G operations, and the evolved universal terrestrial RAN (E-UTRAN) supports 4G (LTE) operations. All three RANs depicted in FIG. 1 are connected to the multi-mode UE 50, thus indicating that the UE is operable in any of those RANs.

The other entities of the EPS architecture 100 provide mobility management for the multi-mode UE 50. Mobility management determines the location of the UE 50 in the EPS 100. In this example, mobility management under 4G is separate from mobility management under 2G and 3G.

A mobility management entity (MME) 28 provides the mobility management functions for the UE 50 when operating under the 4G network (LTE). A mobile switching center (MSC) server 30 and a serving general packet radio service support node (SGSN) 26 provide mobility management functions for the UE 50 when the UE 50 is operating under either the 2G or the 3G networks. The MSC server 30 performs mobility management for voice traffic while the SGSN 26 performs mobility management for data traffic (PS domain).

CSFB enables the provisioning of voice and other circuit switched (CS) domain services to the 4G UE 50. Circuit switched fallback (CSFB) takes place in the multi-mode UE 50 of FIG. 1 whenever 1) the UE is camped in the 4G network (E-UTRAN 24), and either 2) the UE 50 is to initiate a voice call (known as a mobile originating call), or 3) the UE 50 is to receive a voice call (known as a mobile terminating call). Thus, CSFB processing is sometimes known as mobile originated/mobile terminated circuit switched fall back (CSFB) call processing.

Since the multi-mode UE 50 cannot be in both the 4G network and the 3G network at once, coordination between the mobility management entities (the MME 28 in the 4G network and the SGSN 26 and MSC server 30 in the 3G or 2G networks) takes place such that the voice call can occur.

Figure 2:
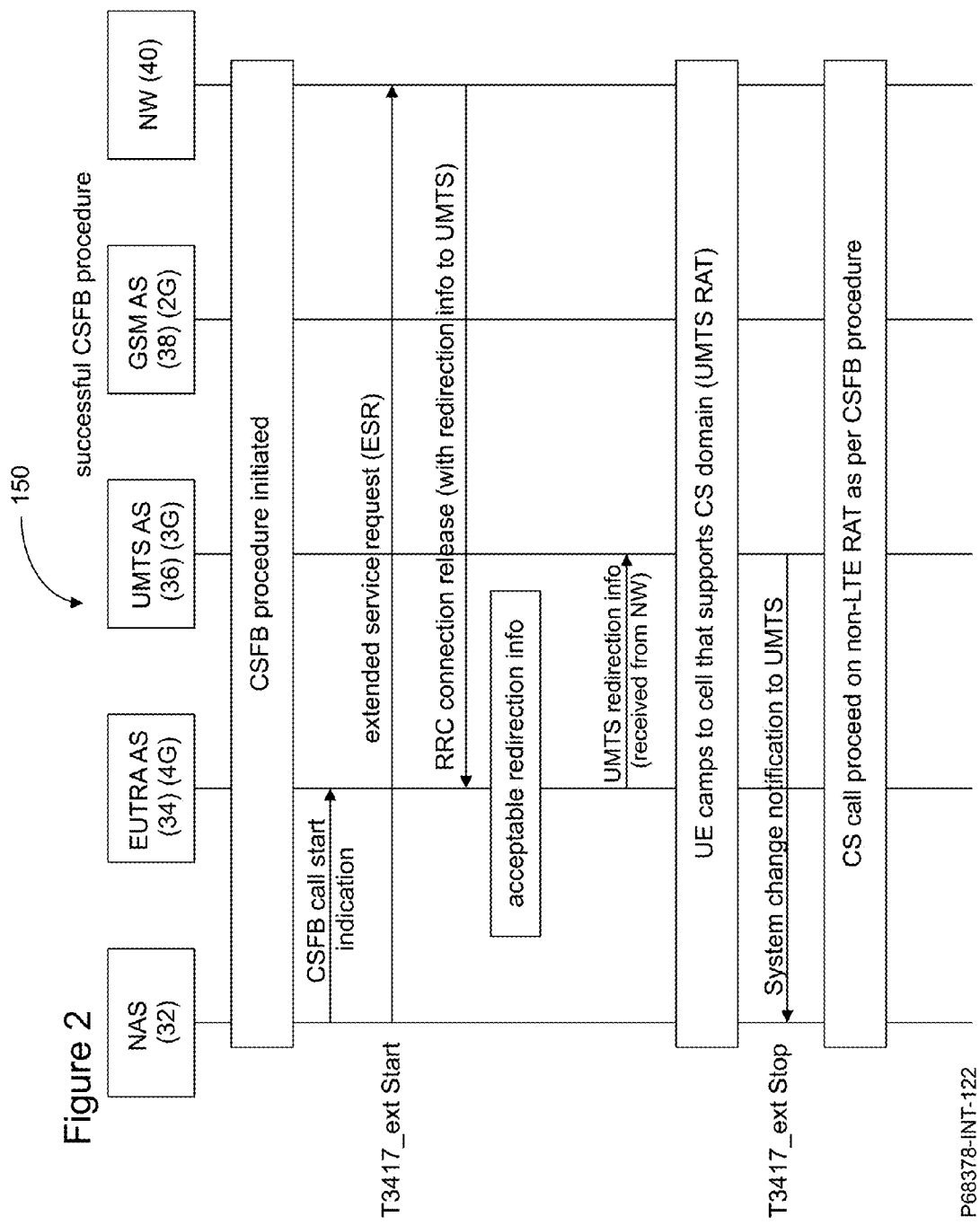
FIG. 2 is a timing diagram showing a successful circuit switched fallback operation, according to some embodiments.

FIG. 2 is a simplified diagram of a successful CSFB operation taking place in a multi-mode network 150, according to some embodiments. Here, the multi-mode network 150 consists of different access strata (AS), a non-access stratum (NAS) 32, an EUTRA access stratum 34 (4G), a universal mobile telecommunications system (UMTS) access stratum 36 (3G), a global system for mobile communication (GSM) access stratum 38 (2G), and the network (NW) 40.

The diagram of FIG. 2 is a type of flow diagram, with operations at the top being performed at a first time period and each succeeding operation lower in the figure being performed thereafter in succeeding time periods.

First, the CSFB procedure is initiated. It is known that the multi-mode UE 50 is camped on the EUTRA access stratum 34 (otherwise, a CSFB procedure would not be necessary). It is also known that either a voice call to the UE 50 (mobile terminating call) or a voice call from the UE (mobile originating call) is initiated. A CSFB call start indication is noted between the NAS 32 and the EUTRA AS 34 in FIG. 2. The CSFB call start indication may specify UDI video or a CS voice call, two examples of operations not supported on most 4G phones but fully supported under the 3G operation of most phones.

The CSFB call start indication triggers an extended service request (ESR) by the NAS 32 to all entities in the multi-mode network 150. The ESR message is sent by the UE 50 to the network 40 to initiate the CSFB procedure or to respond to a CSFB request from the network. A T3417_ext timer is initiated to track whether a response to the ESR is received in time. Following the ESR message, a radio resource control (RRC) connection release message is received from the network 40 to the EUTRA access stratum 34. This is acceptable redirection information received from the network 40 that enables the UE 50 to camp on a cell that supports the CS domain (in this example, the 3G UMTS 36).

The voice call proceeds on the UMTS RAT of the UE 50 and the CSFB procedure is complete.

Thus, in the mobile originated/mobile terminated circuit switched fall back (CSFB) call processing, the multi-mode UE 50 sends an extended service request (ESR) to the network. If the network accepts the call request, the UE 50 receives an ERRC connection release with redirection to either GSM (2G) or UTRAN (3G).

Typically, where the CSFB procedure fails, the network sends a service reject (SR) message back to NAS layer 32 of the UE 50. Currently, the 3GPP specification sections 23.272 and 24.301 list the recovery mechanism in such cases.

There are other conditions, however, in which the CSFB procedure fails. These conditions are not considered in the above-mentioned sections of the 3GPP specification. But, as seen empirically in live networks, due to circumstances such as low signal area, high mobility, or race conditions between the ongoing EMM procedure and the CSFB ESR request procedure described above, the CSFB procedure may fail. (EPS mobility management, or EMM, is a set of network-initiated procedures such as authentication, identification, security mode control and so forth that take place on behalf of the UE 50.)

For example, when the CSFB procedure fails, the multi-mode UE 50 could receiving one of the following error conditions:
  an ERRC connection release air message without the redirection information element (IE); or
  wrong RAT/frequency/band in the redirection IE; or
  no ERRC connection release message received by UE.
Each of these conditions will be described in more detail in the following paragraphs.

There are other conditions in which the multi-mode UE 50 receives the ERRC connection release message with the correct redirection information, and yet the CSFB procedure fails anyway. Issues such as the high mobility of the UE 50, the UE being camped at the cell edge, low signal area conditions, blind spots, and other extreme conditions may make it impossible for the UE to find a suitable cell in the provided frequency/frequencies during fallback to the CS network, which would result in a CSFB redirection failure.

Figure 7:
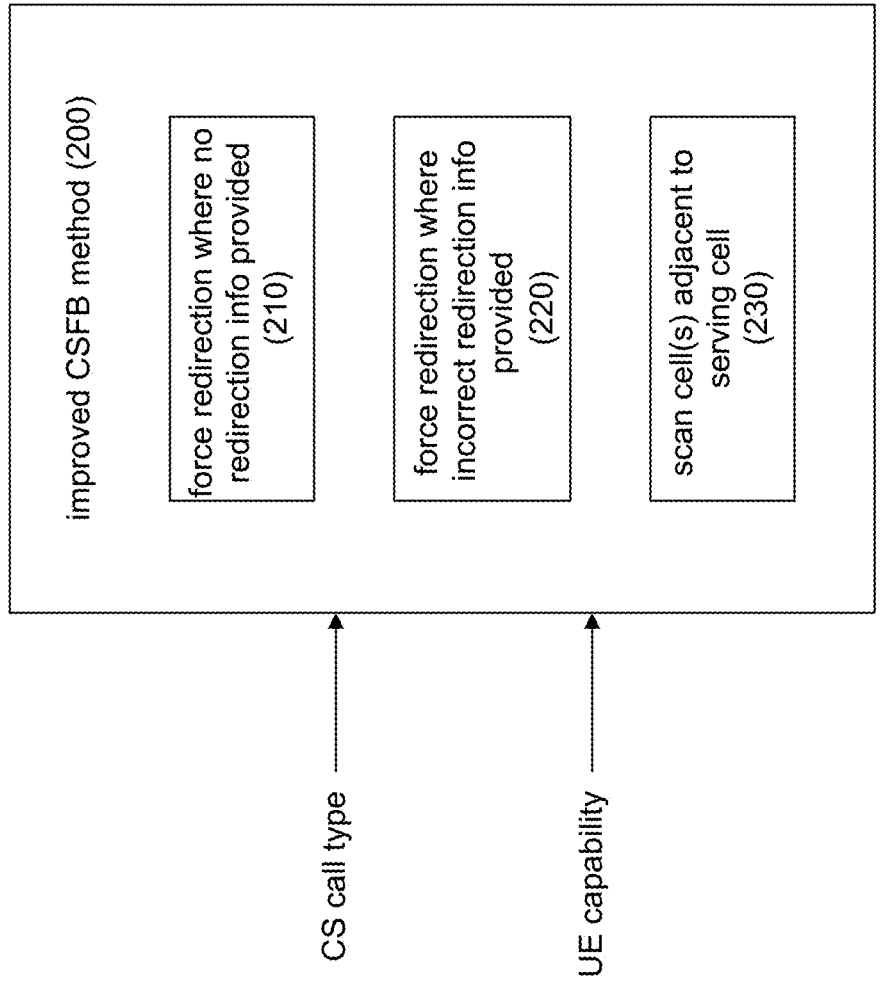
FIG. 7 is a simplified block diagram showing the functional features of the improved circuit switched fallback method, according to some embodiments.

FIG. 7 is a simplified functional block diagram of an improved CSFB method 200, according to some embodiments. Before discussing this illustration in detail, the error conditions cured by the improved CSFB method 200 are discussed, for better understanding.

FIGS. 3-6 are flow diagrams, similar to the diagram of FIG. 2, in which the above-described situations are resolved using the improved CSFB method 200, according to some embodiments. These situations have been tested in live networks and show that, using the improved CSFB method 200, the UE is capable of recovering the CS call and proceed with the autonomous reselection to the CS domain RAT (UMTS or GSM) and continue with the CSFB call procedure.

Figure 3:
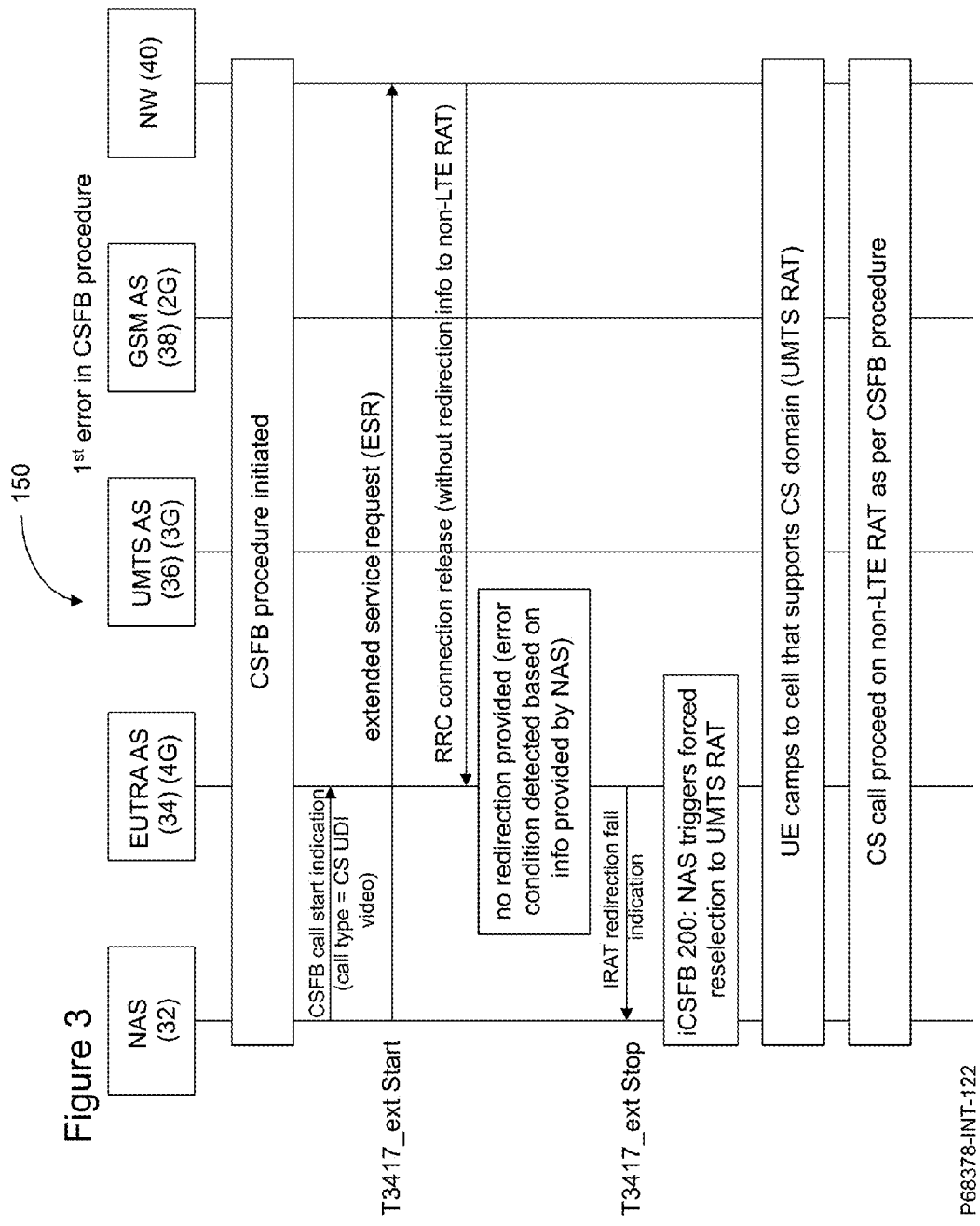
FIG. 3 is a timing diagram showing a first error condition resolved using the improved circuit switched fallback method of FIG. 7, according to some embodiments.

FIG. 3 provides an example that result when no redirection information is provided to the UE 50. As in FIG. 2, the multi-mode network 150 consists of the non-access stratum (NAS) 32, the EUTRA access stratum 34 (4G), the UMTS access stratum 36 (3G), the GSM access stratum 38 (2G), and the network (NW) 40. The multi-mode UE 50 is camped on the EUTRA access stratum 34 and either a mobile originating call is initiated. A CSFB call start indication is noted between the NAS 23 and the EUTRA AS 34. Here, the CSFB call start indication specifies UDI video.

Figure 4:
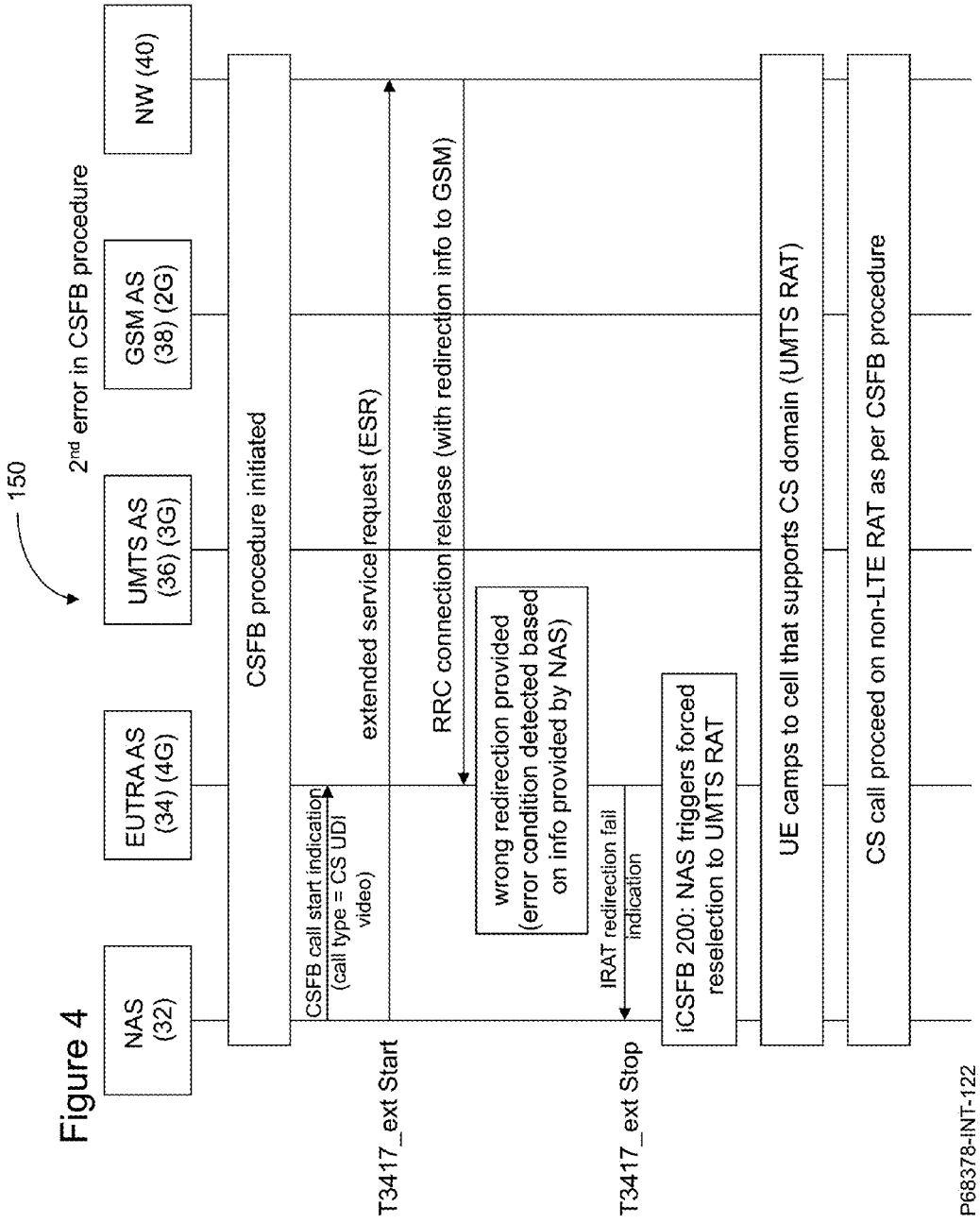
FIG. 4 is a timing diagram showing a second error condition resolved using the improved circuit switched fallback method of FIG. 7, according to some embodiments.

It should be noted that, although a circuit switched operation, UDI video is supported under 3G but not under 2G. Thus, a CSFB redirection from 4G to 2G in this circumstance would result in a failure. This error condition is illustrated in FIG. 4, below.

When the UE 50 camps to the LTE network, its level three RRC messages are being served by ERRC, which is short for evolved radio resource control, indicating RRC for 4G (LTE). In FIG. 2 (and in FIGS. 3-6, below), the EUTRA AS 34 contains ERRC.

In the first error condition (FIG. 3), the ERRC connection release air message is sent without any redirection information. This results in the UE 50 not getting the information from the network 40 about where next to camp.

The CSFB call start indication triggers an extended service request (ESR) by the NAS 32 to the multi-mode network 150. The ESR message is sent by the UE to the network 40 to initiate the CSFB procedure or to respond to the CSFB request from the network. The T3417_ext timer is initiated to track whether a response to the ESR is received in time. Following the ESR, an RRC connection release is received from the network 40 to the EUTRA AS 34. There is no redirection information received from the network 40 that enables the UE 50 to camp on a cell that supports the CS domain (in this example, the 3G UMTS 36). Thus, an IRAT redirection fail indication is sent from the UE 50 to the NAS 32.

The IRAT redirection fail indication is an inter-RAT message that tells the NAS 32 that the UE 50 did not get the redirection information (either 2G or 3G) from the network 40. Normally, this would be the end (and a failure) of the CSFB procedure. The improved CSFB method 200 (iCSFB 200), however, enables the UE 50 to force-redirect itself to the appropriate RAT. As illustrated in FIG. 3, the UE 50 force-redirects itself to the UMTS (3G) RAT, since UDI video is not supported on the GSM (2G) RAT. The UE 50 camps on a cell on the UMTS RAT and the voice call proceeds without being dropped.

FIG. 4 illustrates a second error condition in which the improved CSFB method 200 is able to prevent a CS call from being dropped in the UE 50. In contrast to the examples of FIG. 3, the ERRC connection release air message is sent with redirection information, but the redirection information is incorrect. Redirection to the GSM AS 38 is improper when the call type is UDI video, which is only supported in the UMTS AS 36. Again, the improved CSFB method 200 enables the UE 50 to force-redirect itself to the appropriate RAT, in this case, the UMTS (3G) RAT. The UE 50 camps on a cell on the UMTS RAT and the voice call proceeds without being dropped.

Figure 5:
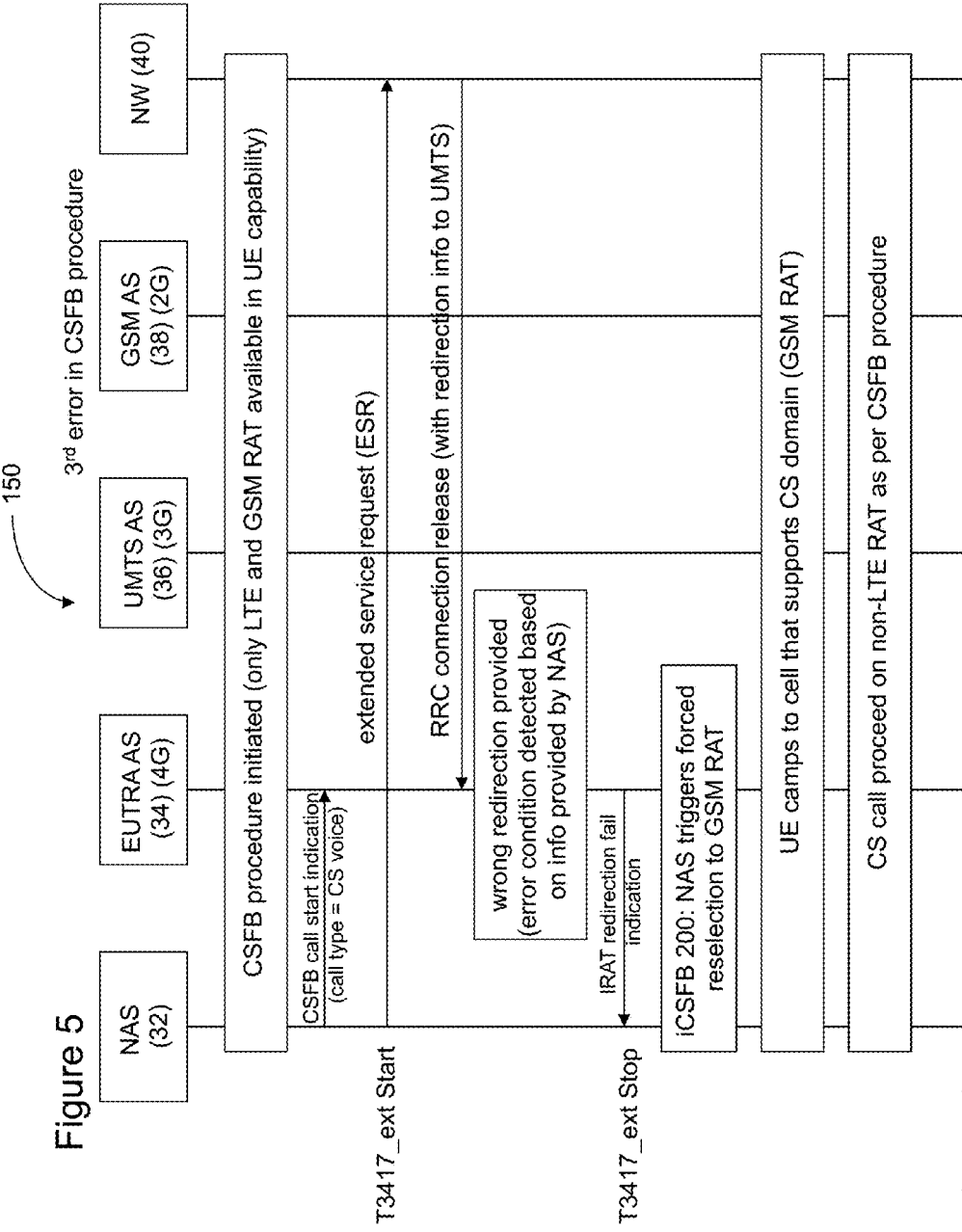
FIG. 5 is a timing diagram showing a third error condition resolved using the improved circuit switched fallback method of FIG. 7, according to some embodiments.

FIG. 5 illustrates a third error condition in which the improved CSFB method 200 is able to prevent a CS call from being dropped in the UE 50. If the UE 50 is configured for dual mode, with GSM+LTE capability, during CSFB callback, if the network 40 redirects to the UMTS RAT in the redirection IE, the CSFB call will fail and be dropped. In FIG. 5, the call type is CS voice (not UDI video) and so either the UMTS RAT or the GSM RAT could be used. But, since the UE 50 is a dual mode GSM+LTE phone, an RRC connection release with redirection information to UMTS fails. This error condition has been observed in some of the live networks in countries which support dual mode UMTS+LTE capability (e.g., Portugal, Norway, UK, and France). The improved CSFB method 200 recognizes this condition and corrects the redirection such that the call is not dropped.

Figure 6:
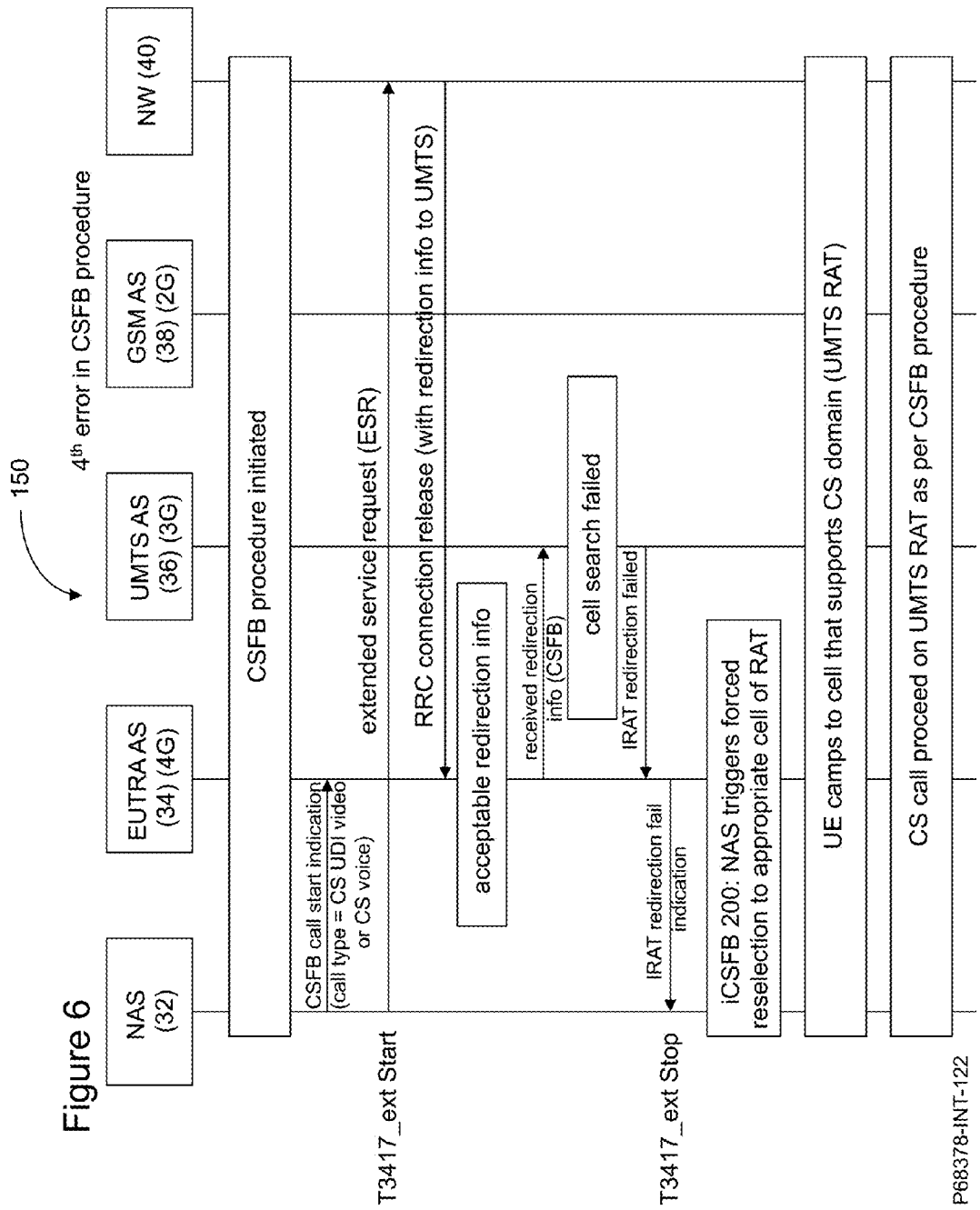
FIG. 6 is a timing diagram showing a fourth error condition resolved using the improved circuit switched fallback method of FIG. 7, according to some embodiments.

Finally, as illustrated in FIG. 6, there are cases where the ESR is issued, the RRC connection release is issued with acceptable redirection information, and the CS call fails nevertheless. This occurs because the UE 50 is unable to find a suitable cell in the frequency/frequencies provided by the network 40 in the redirection IE of the ERRC connection release message. This may be due to the mobility of the UE or other environmental considerations.

Nevertheless, the improved CSFB method 200 is able to resolve this situation as well in many cases. Recall from FIG. 1 that the UE 50 is tied to mobility managers, the SGSN 26 and MSC server 30 for 2G and 3G and the MME 28 for 4G. These mobility managers keep location information in a database and, when a CSFB procedure is initiated, the database is accessed to determine the UE's location. Further, the parameters for each access stratum are different, so some of the mobility management is performing a sort of translation between one set of parameters and another. Sometimes, errors occur in the translation. Other times, errors occur because of the mobility of the UE.

FIG. 6 shows that, after receiving the acceptable redirection information, in this case, to the UMTS, the UMTS AS 36 performs a cell search to find the UE 50 and fails. The IRAT redirection fail indication is sent to the EUTRA AS 34 and then to the NAS 32. The improved CSFB method 200 is able to rescue this situation by performing one or more neighboring cell searches until the UE 50 finds a suitable cell in one or more adjacent cells of the RAT. The UE 50 camps to the discovered cell on the UMTS RAT.

Returning to the simplified block diagram of FIG. 7, the improved CSFB method 200 includes three functional components relevant to the error conditions described above. First, note that the improved CSFB method 200 is able to correct possible error conditions using two inputs: the CS call type and the capability of the UE 50. In some cases, the CS call type limits the access stratum technology upon which the UE 50 can be camped (e.g., UDI video not supported on 2G AS). The capability of the UE 50 also sometimes limits where the UE can be camped (e.g., dual mode UEs supporting LTE+GSM).

The functional components of the improved CSFB method 200 include:
- force redirection where no redirection information is provided (210);
- force redirection where incorrect redirection information is provided (220); and
- scan cell(s) adjacent to serving cell when redirected cell not found (230)

FIG. 3 illustrates the improved CSFB method 200 employing the first function 210 in which no redirection information is provided. FIGS. 4 and 5 illustrate the improved CSFB method 200 employing the second function 220 in which incorrect redirection information is provided. FIG. 6 illustrates the improved CSFB method 200 employing the third function 230 in which correct redirection information is provided but the UE is not found in the searched cell.

In some embodiments, the improved CSFB method 200 has been implemented in modems residing in user equipment, resulting in a 20% improvement, with a 90% success rate, up from 70% without the method.

Figure 8:
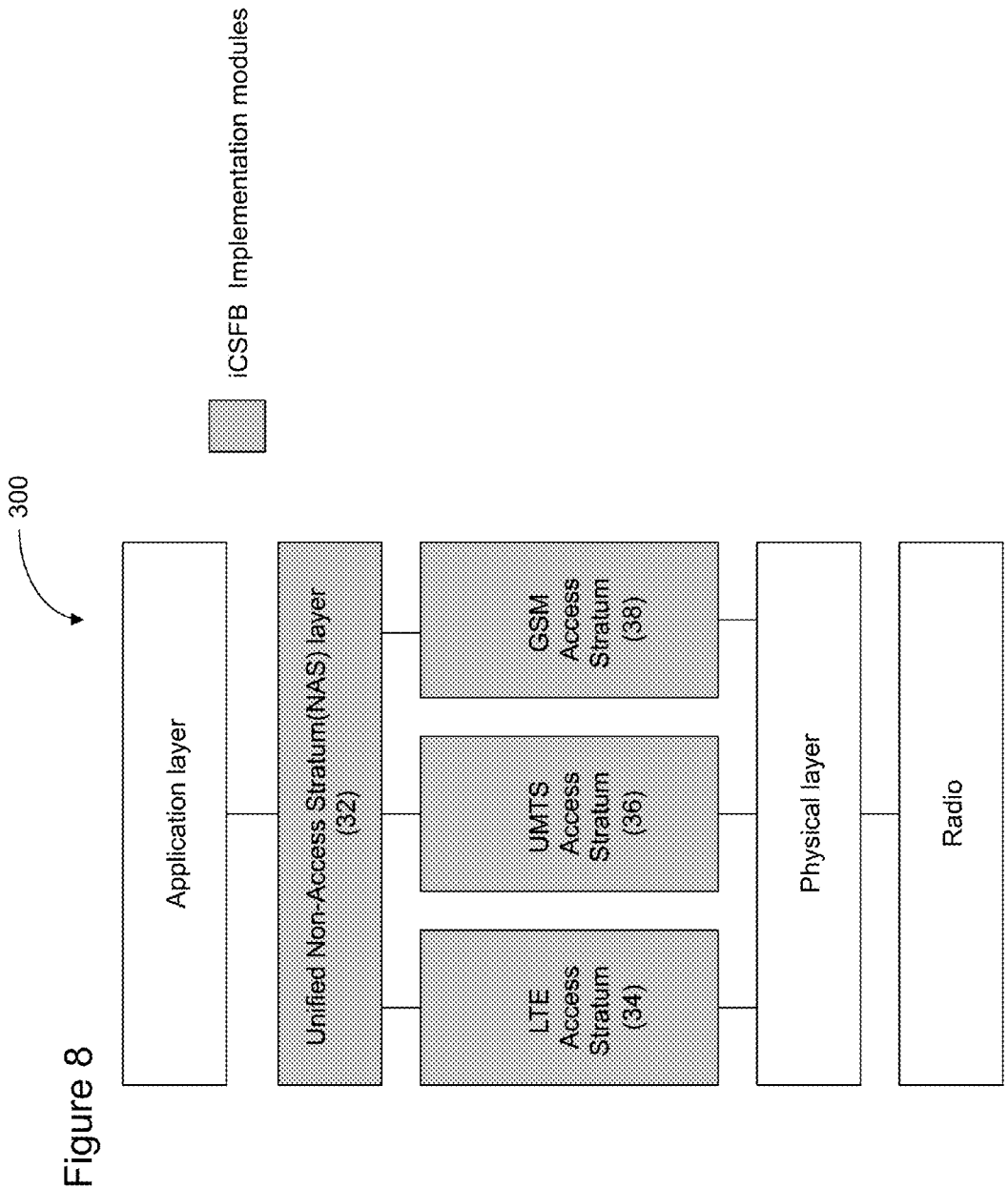
FIG. 8 is a simplified block diagram of a protocol stack 300 used by a multi-mode user equipment employing the improved circuit switched fallback method of FIG. 7, according to some embodiments.

The idea of the improved CSFB method 200 is applicable for the multi-mode protocol stack, in some embodiments. FIG. 8 is a simplified block diagram of a simple protocol stack 300 of the multi-mode UE 50. The improved CSFB method 200 is implemented on the areas shaded in the figure, namely, the non-access stratum 32, the LTE access stratum 34, the UMTS access stratum 36, and the GMS access stratum 38 parts of the multi-mode protocol stack design.

Figure 9:
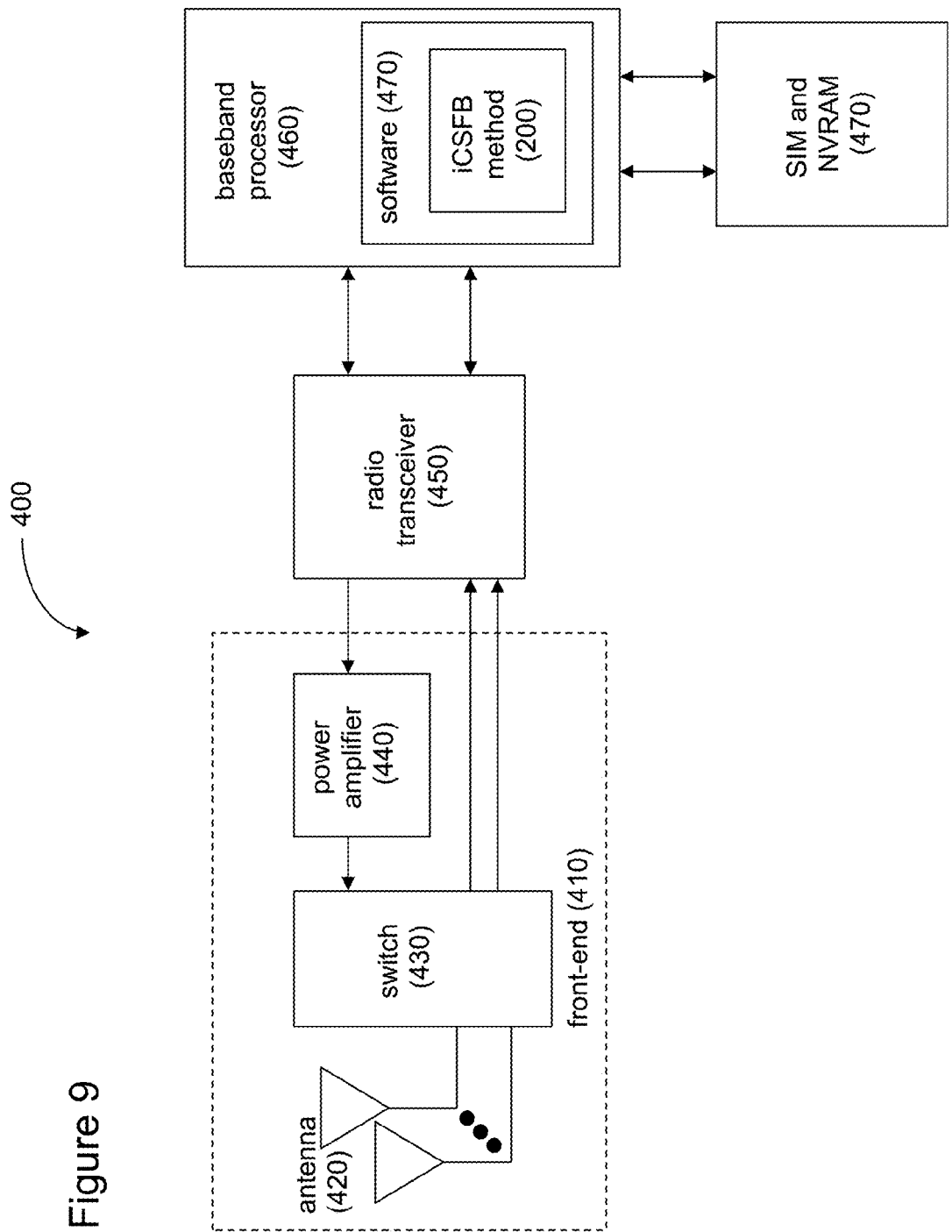
FIG. 9 is a simplified block diagram of a modem used in user equipment employing the improved circuit switched fallback method of FIG. 7, according to some embodiments.

FIG. 9 is a simplified block diagram of a modem 400 to be incorporated into the UE 50 described above to implement the iCSFB method 200, according to some embodiments. The modem 400 includes a front end 410, a radio transceiver 450, and a baseband processor 460. The front end 410 includes one or more antenna(e) 420, a switch 430, and a power amplifier 440. Both the switch 430 and power amplifier 440 connect directly to the radio transceiver 450, which interfaces also with the baseband processor 460. The baseband processor 460 includes software 470 that implements the improved CSFB method 200 described above. A SIM and NVRAM unit 470 is coupled to the baseband processor.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. An improved circuit switched fallback (CSFB) method to be performed in a user equipment (UE) operating in a multi-mode network comprising a non-access stratum (NAS), a universal mobile telecommunications system (UMTS) access stratum (AS), a global system for mobile communication (GSM) AS, and an evolved universal terrestrial radio access network (E-UTRAN) AS, the improved CSFB method comprising:
   determining that the UE is camped in the E-UTRAN AS and is either initiating or receiving a voice call;
   noting a CSFB call start indication between the NAS and the E-UTRAN AS, wherein the CSFB call start indication triggers an extended service request (ESR) by the UE to all AS in the multi-mode network;
   determining that a radio resource control (RRC) connection release following the ESR provides no redirection information; and
   before a timer, initiated at the CSFB call start indication, expires, forcing redirection of the UE from E-UTRAN AS to a second radio access technology (RAT) such that the UE camps at the second RAT and is able to successfully complete the voice call;
wherein an inter-RAT redirection fail indication is not transmitted from the UE to the NAS.

2. The improved CSFB method of claim 1, wherein the initiated or received voice call is a circuit switched call type.

3. The improved CSFB method of claim 2, wherein the circuit switched call type is circuit switched unified display interface (UDI) video and the second RAT is a universal mobile telecommunication system (UMTS).

4. The improved CSFB method of claim 2, wherein the circuit switched call type is circuit switched voice.

5. The improved CSFB method of claim 4, wherein the second RAT is a universal mobile telecommunication system (UMTS).

6. The improved CSFB method of claim 2, wherein the circuit switched call type is circuit switched voice and the second RAT is a global system for mobile communication (GSM).

7. An improved circuit switched fallback (CSFB) method to be performed in a user equipment (UE) operating in a multi-mode network comprising a non-access stratum (NAS), a universal mobile telecommunications system (UMTS) access stratum (AS), a global system for mobile communication (GSM) AS, and an evolved universal terrestrial radio access network (E-UTRAN) AS, the improved CSFB method comprising:
   determining that the UE is camped in the E-UTRAN AS and is either initiating or receiving a voice call;
   noting a CSFB call start indication between the NAS and the E-UTRAN AS, wherein the CSFB call start indication triggers an extended service request (ESR) by the UE to all AS in the multi-mode network;
   determining that a radio resource control (RRC) connection release following the ESR provides incorrect redirection information; and
   before a timer, initiated at the CSFB call start indication, expires, forcing redirection of the UE from E-UTRAN AS to a second radio access technology (RAT) such that the UE camps at the second RAT and is able to successfully complete;
wherein an inter-RAT redirection fail indication is not transmitted from the UE to the NAS.

8. The improved CSFB method of claim 7, wherein the initiated or received voice call is a circuit switched call type.

9. The improved CSFB method of claim 8, wherein the circuit switched call type is circuit switched unified display interface (UDI) video.

10. The improved CSFB method of claim 9, wherein the second RAT is a universal mobile telecommunication system (UMTS).

11. The improved CSFB method of claim 7, wherein the forced redirection is based on a capability of the user equipment.

12. An improved circuit switched fallback (CSFB) method to be performed in a user equipment (UE) operating in a multi-mode network comprising a non-access stratum (NAS), a universal mobile telecommunications system (UMTS) access stratum (AS), a global system for mobile communication (GSM) AS, and an evolved universal terrestrial radio access network (E-UTRAN) AS, the improved CSFB method comprising:
   noting a CSFB call start indication between the NAS and the E-UTRAN AS, wherein the CSFB call start indication triggers an extended service request (ESR) by the UE to all AS in the multi-mode network, wherein the UE is camped in the E-UTRAN AS and is either initiating or receiving a voice call;
   receiving redirection information during a CSFB procedure, wherein the redirection information specifies a radio access technology (RAT) other than the E-UTRAN AS;
   determining that a specified cell location within the RAT, the specified cell location identifying the location of the UE, is incorrect; and
   searching for a suitable cell in one or more adjacent cells of the RAT, wherein the CSFB procedure consults a mobility manager comprising location information of the UE to facilitate finding the suitable cell, wherein the suitable cell comprises a cell in which circuit-switched services are available;
wherein the CSFB procedure completes such that a circuit-switched operation of the user equipment is not dropped.

13. The improved CSFB method of claim 12, further comprising:
   receiving from the mobility manager location information for a second RAT other than the RAT; and
   translating the mobility manager location information to be understood by the RAT.

14. A modem comprising a front-end, a radio transceiver, and a baseband processor, the modem to operate in a multi-mode user equipment operating in a multi-mode network, the multi-mode user equipment supporting a global system for mobile communication (GSM) AS and an evolved universal terrestrial radio access network (E-UTRAN) AS radio access technologies (RATs), but not a universal mobile telecommunications system (UMTS) access stratum (AS) wherein the modem is camped in the E-UTRAN AS, the baseband processor comprising software to perform the following operations:

identifying a redirection to the UMTS AS during a circuit switched fallback procedure in which a call start indication between a non-access stratum and the E-UTRA AS triggers an extended service request; and causing the non-access stratum to trigger a forced reselection to the GSM AS;

wherein the multi-mode user equipment camps to a GSM cell such that a circuit-switched operation is completed at the user equipment.

15. The modem of claim 14, wherein a circuit switched voice call is not unified display interface video.

16. A modem comprising a front-end, a radio transceiver, and a baseband processor, the modem to operate in a multi-mode user equipment to be used in a multi-mode network, the multi-mode user equipment supporting only second generation, third generation, and fourth generation radio access technologies (RATs) wherein the modem is camped in the fourth generation RAT, the baseband processor executing software to perform the following operation:

noting a circuit switched fall back (CSFB) call start indication between a non-access stratum (NAS) and the fourth generation RAT, wherein the CSFB call start indication triggers an extended service request (ESR) to all AS in the multi-mode network;

initiating a timer in response to the CSFB call start indication; determining that a radio resource control (RRC) connection release following the ESR provides either no redirection information or incorrect redirection information; and before the timer expires, forcing reselection, by a non-access stratum from a fourth generation RAT to a new RAT such that the multi-mode user equipment camps on the new RAT and is able to successfully complete a voice call; wherein an inter-RAT fail indication is avoided.

17. The modem of claim 16, wherein the RRC provides no redirection information, the circuit-switched operation comprises a circuit switched universal display interface video call type, and the new RAT comprises the third generation RAT.

18. The modem of claim 16, wherein the RRC provides no redirection information, the circuit-switched operation comprises a circuit-switched voice call, and the new RAT comprises either the second generation RAT or the third generation RAT.

19. The modem of claim 16, wherein the RRC provides incorrect redirection information to the second generation RAT, the circuit-switched operation comprises a video call only supported in the third generation RAT, and the new RAT comprises the third generation RAT.

20. The modem of claim 16, wherein the RRC provides incorrect redirection information to the third generation RAT, the user equipment operates in either a second generation RAT or a fourth generation RAT, and the new RAT comprises the second generation RAT.

\* \* \* \* \*